United States Patent [19]

Carroll

[11] Patent Number: 5,643,527

[45] Date of Patent: *Jul. 1, 1997

[54] METHOD OF INJECTION MOLDING

[75] Inventor: Robert E. Carroll, Longwood, Fla.

[73] Assignee: ICP Systems, Inc., Center Line, Mich.

[*] Notice: The term of this patent shall not extend beyond the expiration date of Pat. No. 5,458,846.

[21] Appl. No.: 538,081

[22] Filed: Oct. 2, 1995

Related U.S. Application Data

[63] Continuation of Ser. No. 260,609, Jun. 15, 1994, Pat. No. 5,458,846, which is a continuation of Ser. No. 16,261, Feb. 11, 1993, abandoned, which is a division of Ser. No. 798,863, Nov. 22, 1991, Pat. No. 5,273,707, which is a continuation of Ser. No. 279,849, Dec. 5, 1988, abandoned.

[51] Int. Cl.$^6$ .................................................. B29C 45/00

[52] U.S. Cl. ............... 264/500; 264/328.8; 264/328.12; 264/328.13

[58] Field of Search .................... 264/85, 328.8, 264/328.12, 328.13, 335, 500, 572; 425/437

[56] References Cited

U.S. PATENT DOCUMENTS

| | | | |
|---|---|---|---|
| 2,435,610 | 2/1948 | Schneider | 264/500 X |
| 2,615,229 | 10/1952 | Blackburn et al. | 425/437 X |
| 3,044,118 | 7/1962 | Bernhardt et al. | 264/85 |
| 3,345,687 | 10/1967 | Marx | 425/437 X |
| 4,201,742 | 5/1980 | Hendry | 264/45.5 |
| 4,295,811 | 10/1981 | Sauer | 425/112 |
| 4,309,380 | 1/1982 | Sauer | 264/511 |
| 4,474,717 | 10/1984 | Hendry | 264/572 X |
| 4,531,703 | 7/1985 | Underwood | 425/437 X |
| 4,740,150 | 4/1988 | Sayer | 425/542 |
| 4,755,128 | 7/1988 | Alexander | 425/437 X |
| 4,948,547 | 8/1990 | Hendry | 264/500 |
| 5,344,596 | 9/1994 | Hendry | 264/500 X |

FOREIGN PATENT DOCUMENTS

| | | |
|---|---|---|
| 1315088 | 9/1988 | Australia . |
| 283207 | 9/1968 | European Pat. Off. . |
| 127961 | 12/1984 | European Pat. Off. . |
| 2105498 | 4/1972 | France .................................. 425/437 |
| 43-7462 | 3/1968 | Japan .................................... 425/437 |
| 61-121915 | 6/1986 | Japan .................................... 425/437 |
| 304141 | 7/1971 | U.S.S.R. ................................ 425/437 |
| 1556170 | 11/1979 | United Kingdom . |
| 2122130 | 1/1984 | United Kingdom . |
| 2139549 | 11/1984 | United Kingdom . |

OTHER PUBLICATIONS

Patent Abstracts of Japan, vol. 4, No. 164 (M–41) (646) 14 Nov. 1980 & JP-A-55 113 539 (Asahi Dow K.K.) 2 Sep. 1980.

Patent Abstracts of Japan, vol. 10, No. 159 (M–486) (2215) 7 Jun. 1986 & JP-A-61 012 312 (Hashimoto Forming Kogyo K.K.) 20 Jan. 1986.

Research Disclosure, vol. 5, No. 217, May 1982, Havant GB pp. 135–136; J.O. Clark et al.

Machine Design, vol. 54, No. 28, 9 Dec. 1982, Cleveland U.S.; D.R. Dreger.

Patent Abstracts of Japan, vol. 9, No. 121 (M–382) (1844) 25 May 1985 & JP-A-60 008 022 (Ichiko Kogyo K.K.) 16 Jan. 1985.

*Primary Examiner*—Leo B. Tentoni
*Attorney, Agent, or Firm*—Harness, Dickey & Pierce

[57] ABSTRACT

An injection mold apparatus has a core and cavity halves. One or more gas poppet valves are affixed in the injection mold either in the movable and/or in the stationary halves of the mold. The poppet valves (or poppets) are located to open into a mold portion formed in the cavity between the movable portion of the injection mold and the fixed mold portion when the mold portions are closed. At least one gas line is connected to the poppets and to a gas pressure source and is adapted to open the poppets to the passage of nitrogen or other gas into the mold following the injection of molten plastic into the closed mold halves. Porous metal covers may be used to cover the opening in the mold either the movable and/or stationary halves of the injection mold in lieu of the gas poppet valves, and the gas pressure through the porous metal cover can be used to carry out the molding operation. An injection molding method is also taught using the injection of nitrogen gas into the mold immediately following the injection of the liquid plastic.

12 Claims, 2 Drawing Sheets

METHOD OF INJECTION MOLDING

This is a continuation of U.S. patent application Ser. No. 08/260,609, filed Jun. 15, 1994, now U.S. Pat. No. 5,458,846 issued Oct. 17, 1995, which is a continuation of application Ser. No. 08/016,261, filed Feb. 11, 1993, now abandoned, which is a division of application Ser. No. 07/798,863, filed Nov. 22, 1991, now U.S. Pat. No. 5,273,707 issued Dec. 28, 1993, which is a continuation of application Ser. No. 279, 849, filed Dec. 5, 1988, now abandoned.

BACKGROUND OF THE INVENTION

The present invention relates to an injection molding method and injection mold and especially to an injection mold with gas openings on the stationary or movable halves of the mold or from both sides for applying gas under pressure to the plastic mold.

Injection molding machines are used in shaping thermoplastic compositions. The preheating, plasticizing and shaping are all done in the injection molding machine where the thermoplastic is heated and plasticized and injected under pressure into the mold by means of a screwram which forces the material through a nozzle in to the mold. The molds are formed in two or more components which fit together to form a cavity therebetween. The mold is mounted to the injection molding machine and has a fixed portion and a moving portion. The mold has a movable portion which is connected to a moving platen of the molding machine for opening and closing the mold. When the mold is closed, the heated (plasticized) plastic is injected into the cavity, where it is allowed to cool to sufficiently harden the polymer before opening the mold by the moving of the movable portion of the injection mold. The polymer part or parts are then ejected from the mold which has formed an article of manufacture or a portion of an article of manufacture.

The present invention deals with a molding process in which the movable, stationary or both portions of the mold has gas injection ports fitted to each part of the mold to apply a nitrogen or other gas pressure to the one side or both sides of the part being molded during the molding process. The gas entry ports are covered either with a porous metal which is porous to the flow of the nitrogen gas but will block the entry of the more viscous plasticized polymer into the porous metal holes. The ports may also be sealed with poppet valves which are opened under the gas pressure which is applied sometime after the injection of the molten plastic into the mold cavity.

Gas and especially nitrogen has been commonly used in injection molding processes to apply a gas pressure through the injection nozzle for increasing the pressure behind the molten plastic being injected into the mold cavity. Two prior Sauer U.S. Pat. Nos. 4,295,811 and 4,309,380, show a blow molding process applying the gas into the thermoplastic articles through a porous metal section equipped to the core rod which is inserted into the polymer for expanding the polymer into a mold. These patents teach a different type of molding process from the present invention by using a porous metal for injecting the required air to form the blow molded part.

The aim of the present invention is to provide an injection mold and method which can apply a gas pressure to the outer surfaces of the molding and can apply the gas to a plurality of locations, at least one or more in each isolated mold portion, which gas pressure can be the same or can be varied within each section of the mold.

SUMMARY OF THE INVENTION

An injection molding method and mold apparatus are provided having a fixed mold portion having a sprue bushing therethrough and having a movable platen slidably mounted on a plurality of tie bars and having a movable portion of an injection mold attached thereto. At least one gas poppet valve is mounted to the mold and each poppet valve is located to open into one or more separate isolated mold portions formed between the movable portion of the injection mold and the fixed portion of the injection mold when the mold portions are closed. Alternatively, gas bores can have openings in each of the separate isolated molds portion between the movable portion of the injection mold and the fixed portion of the injection mold when the mold portions are closed with the bores covered with a porous metal of predetermined porosity. At least one gas line is connected to the poppet valves, or to one end of the end bore having the porous metal cover. Each gas line can be connected at the other end to a pressure source adapted to pressurize each poppet valve (or through each porous metal cover) to open the valve to the passage of gas, such as nitrogen, into the mold following the injection of plastic into the closed mold halves. Gas pressure can be applied to each poppet valve, either simultaneously or intermittently. Each poppet valve is spring loaded with a predetermined pressure to close the valve, and a predetermined fluid pressure placed on the back of the valve overcomes the pressure of the spring. The poppet is opened and similarly, the gas may be controlled against and through the porous metal discs which prevent the flow of the plastics back into the bores when the injection mold is being filled with a melted plastic.

A method of forming an injection molded part includes the steps of attaching mold halves having a cavity therein Onto an injection molding machine and attaching a gas pressure line to the mold. A predetermined quantity of melted thermoplastic polymer having a lesser volume than the mold cavity is injected into the mold. A gas such as nitrogen is injected under pressure into the mold cavity through one or more openings into the mold while the melted thermoplastic polymer is fluid to completely fill the mold cavity under a predetermined pressure to pressurize the mold and thermoplastic polymer in the mold. The thermoplastic polymer is then cooled and the molded part is ejected from the mold. Typically, a plurality of gas lines pressurize the interior of the mold from a plurality of different positions from the same or a different gas source through poppet valves or porous metal covers.

BRIEF DESCRIPTION OF THE DRAWINGS

Other objects, features and advantages of the present invention will be apparent from the written description and the drawings in which.

DESCRIPTION OF THE PREFERRED EMBODIMENT

Figure 1:
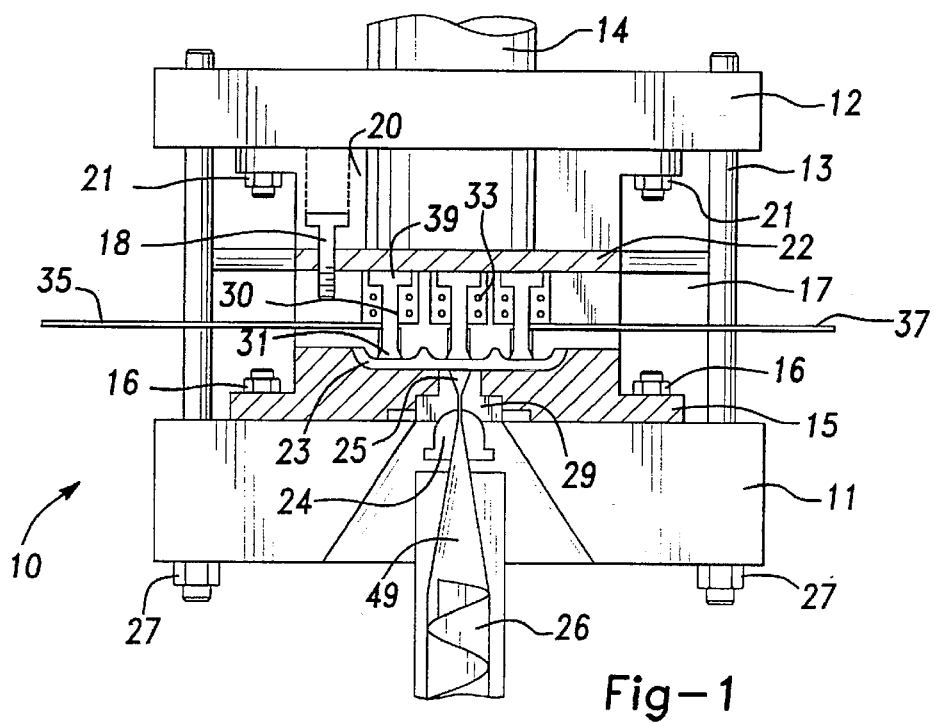
FIG. 1 is a sectional view taken through a portion of an injection mold in a closed position in accordance with the present invention.

Referring to the drawings and especially to FIG. 1, the molding portion of an injection mold and machine 10 has a stationary platen 11 and a moving platen 12 sliding on a plurality of tie bars 13. A clamping ram 14 drives the moving platen 12 to open and close the mold. A fixed mold half 15 is attached to the fixed platen 11 with bolts 16 while a moving mold portion 17 is attached with bolts 18 to mold members 20 which are in turn attached with bolts 21 to the moving platen 12. A steel plate 22 is attached between the attaching members 20 and the moving mold portion 17. When the moving mold portion 17 is driven by the clamping ram 14 to closed the mold as shown in FIG. 1, a molding cavity 23 is formed between the mold halves 15 and 17. The fixed platen 11 has a plastic injection nozzle 24 connected to an injection storage space 25 which has the molten plastic or polymer driven by a screw plunger 26 into the cavity 23 of the closed injection mold. A location ring 27 is formed around the opening 29 passing through the mold path 15. Tie bars 13 are held by tie bar nuts 27 to the fixed platen 11.

Figure 2:
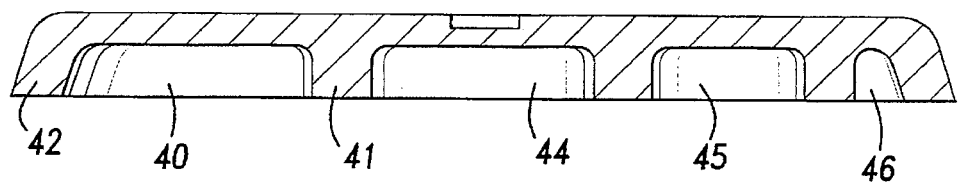
FIG. 2 is a sectional view taken through an injection mold having separate isolated mold portions formed in the mold.

The movable mold portion 17 has a plurality of poppet valves 28. Each poppet valve has a valve member 30 having the valve element 31 on one end to close a bore 32 entering into the cavity 23 through the movable mold portion. Each valve member 30 has a head portion 39 riding in a cavity 33 and having a spring 34 therein biasing against the head 32 to keep the poppet valve member 30 in a closed position to prevent the entry of a fluid through the valve element 31 and into the cavity 23 and the reverse is also true to keep the injected plastic from going into area 54 of FIG. 3. A gas line 35 connects to the side of the bore 32. Similarly, a second poppet valve 36 has a gas line 37 connecting thereto and to a third poppet valve 38. The opening in each poppet valve is connected into an isolated portion of the mold as shown in FIG. 2. Each poppet valve 28 is opened by applying pressure in the gas line 35 or 37 until sufficient pressure is reached to overcome the pressure within the closed mold cavity 23 and to overcome the spring bias 33 to allow nitrogen gas to enter into the mold cavity 23 on the opposite side from where the polymer has been injected through the nozzle 24. It should however be clear that the gas can be applied to either or both sides of the mold. Different pressures can be utilized in different gas lines 37 and 35, or alternatively, all of the gas lines can be simultaneously pressurized with the same gas pressure or can be pressurized with different pressures. Each opening of each poppet valve 28 is placed around the mold cavity in isolated sections of the mold which would otherwise be blocked off from the entry of gas. For instance, in FIG. 2, a cavity portion 40 might have a cavity wall 41 and the side wall 42 forming an isolated portion 40 while the wall 41 and 43 form an isolated cavity portion 44 and similarly an isolated portion 45 and 46 can be formed within the same mold. Each cavity portion with the walls 41 and 43 blocks the gas that enters into the isolated mold portion from passing to the next isolated mold portion.

In operation, the ram 14 opens and closes the mold halves 17 and 15. Once the mold is closed a molten thermoplastic polymer 49 is injected through the nozzle 24 by the operation of the screw ram 26 to drive the polymer into the cavity 23. When the plastic injection, is completed, filling but not packing out the mold, i.e. the mold is 90 to 95% full, and pressure is allowed through directional valve or valves 82 to lines 35 and 37 to open the poppet valves 28 to allow the gas to enter into the cavity 23. The gas forces the polymer against the other side of the mold to provide a large part of uniform strength characteristics as well as one that is easier to remove, from the mold once the movable portion of the mold 17 is pulled away to open up the mold halves 15 and 17. An even film of gas under pressure forms an open area on one side of the mold cavity and results in the easy ejection of the part after the molding operation.

Figure 3:
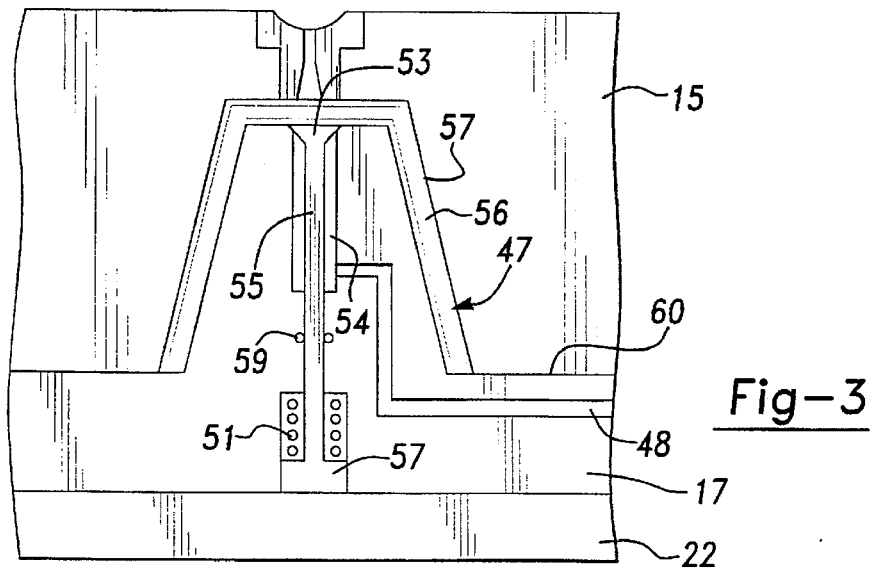
FIG. 3 is a sectional view taken through one poppet valve and isolated mold portion in accordance with the present invention.

In FIG. 3, a portion of a mold half 15 has a movable mold portion 17 mounted adjacent thereto enclosing the mold to form a portion of the cavity 47. A gas line 48 is connected through the movable mold portion 17 into a popper valve 50 having a spring 51 driving against a head 52 to keep the popper valve element 53 closed. The gas line 48 enters into an enlarged bore area 54 around the stem 55. Sufficient gas pressure is applied to the valve to overcome the spring 52 so that when the pressure is applied against the surface of the valve element 53 it will overcome the pressure in the cavity 47 to allow the gas in the line 48 to pass into the cavity 47. Since a molten plastic 56 has been injected into the cavity mold and gas through the poppet valve has been injected into the other side, the pressurized gas 57 forms a substantially even film of gas across the whole surface of the molding between the mold half 17 and the molten polymer 56 all around the portion of the molded part but blocked where the mold comes together at 60 and 61 to isolate that portion 47 of the cavity. The several poppet valves, as illustrated in FIG. 1, are connected directly to each isolated portion of the mold cavity. An O-ring seal 59 seals around each poppet valve stem 55 to seal against the escape of gas thereby.

Figure 4:
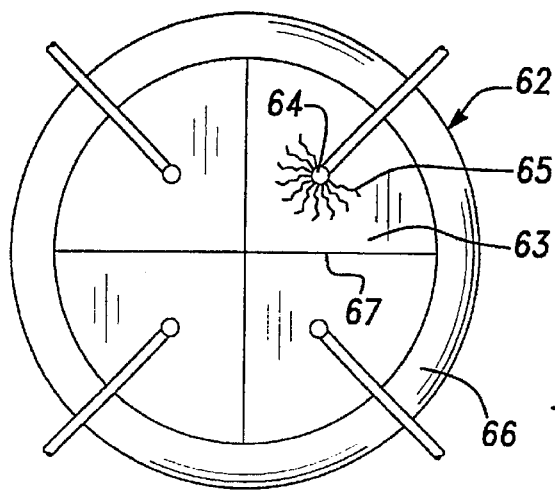
FIG. 4 is a side elevation of an injection mold having isolated mold portions.

As seen in FIG. 4, a mold cavity 62 is divided into four quadrants 63 each having a poppet valve 64 therein for the escape of gas 65 thereinto. A surrounding wall 66 is also formed in the cavity which is broken into four isolated mold portions by the crossing walls 67. It would be clear that this is a simplified elevation of a mold used to illustrate the principal of the present invention.

Figure 5:
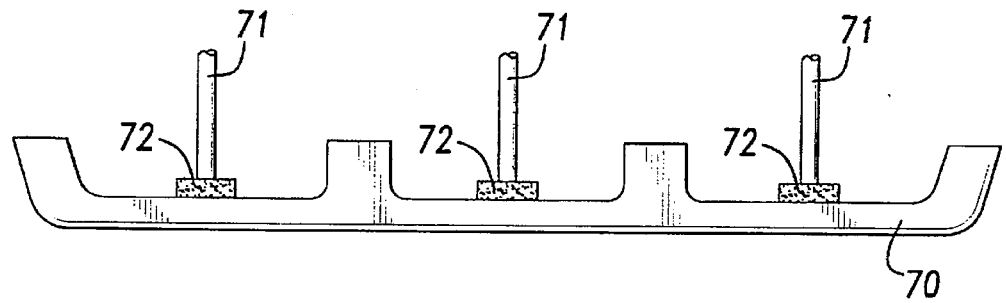
FIG. 5 is a sectional view of an alternate embodiment of a mold using porous metal covers.

In FIG. 5 a mold cavity 70 is illustrated in a modified embodiment in which a movable portion of a mold cavity has gas lines 71 feeding directly through open bores to the cavity which is covered with a porous metal 72. Thus, a nitrogen gas may be fed through the line 71 and will readily pass through the porous metal cover 72 and into the cavity 70 for each isolated portion of the mold. The molten polymer is a viscous liquid and is blocked by the porous metal 72 from getting into the bore 71.

In operation a predetermined pressure has to be applied to the line 71 at the appropriate synchronized time to apply the gas to each sector of the inside of the mold.

Figure 6:
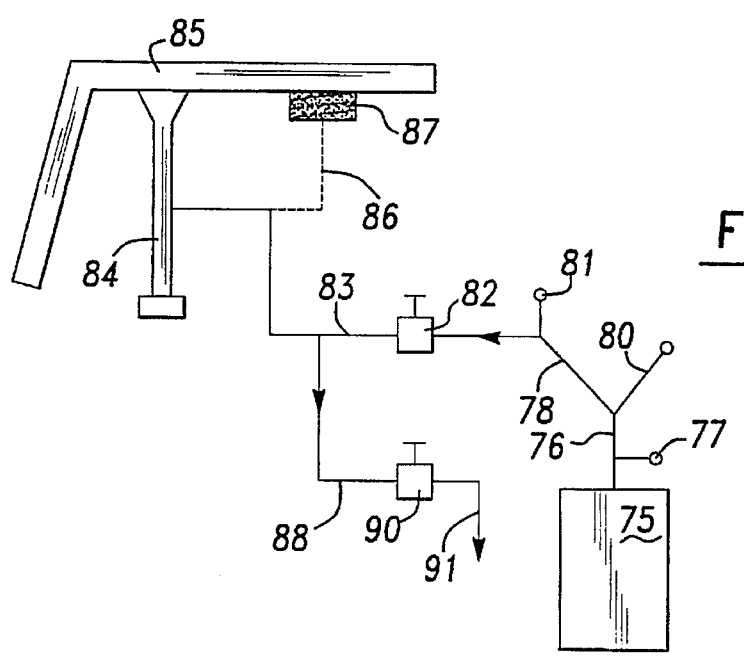
FIG. 6 is a diagrammatic view of a gas supply system.

Turning to FIG. 6 a diagrammatic view of a mold in accordance with the present invention is illustrated having a tank of nitrogen 75 feeding a gas line 76 through a control valve 77. The gas can be fed through a plurality of lines 78 and 80 to different portions of the mold and may have pressure gages 81 and cut off valves 82. The gas is fed through the line 83 into a poppet valve 84 and into a mold cavity 85. Alternatively, the gas can be fed through a gas line 86 through a porous metal 87 into the mold cavity 85. Each poppet valve or porous valve cover 87 is normally placed within an isolated portion of the mold cavity so that gas is applied to all isolated portions of the mold cavity during the molding process. A gas release line 88 is fed past a valve 90 to vent the gas out the line 91.

A method of forming an injection molded part includes attaching a mold having a cavity formed therein with a fixed mold portion and a movable mold portion to an injection molding machine including the step of attaching at least one gas pressure line to the mold. The method includes injecting a predetermined quantity of melted thermoplastic polymer into the mold in which the predetermined quantity of melted thermoplastic is a lesser volume than the mold cavity. Then injecting a gas, especially a nitrogen gas, under pressure into the mold cavity through at least one gas pressure line while the melted thermoplastic polymer is still fluid, to completely fill the mold cavity under a predetermined pressure to pressurize the thermoplastic polymer. The melted thermoplastic polymer is then cooled to harden the polymer in the mold and the part is then ejected from the mold. In the preferred embodiment, one or more gas pressure lines are attached to the mold and the gas injected under pressure into the mold is injected through the plurality of the gas pressure lines. The step of attaching a plurality of gas pressure lines to the mold can attach the pressure lines through either the fixed or the movable portion of the mold or both but, in the illustrated embodiment, the gas lines are attached to the movable portion of the mold especially to mold portions opening in different isolated cavity portions of the mold. Gas lines may be attached through poppet valves which are spring loaded to open only when a predetermined gas pressure is applied to the gas lines. Alternatively, the gas lines can be attached to the mold adjacent the opening through the mold which has a porous metal cover over each opening into the mold cavity which allows the gas under pressure to be applied to the mold cavity while blocking the melted thermoplastic from entering the gas openings into the mold.

It should be clear at this time that an injection molding method and apparatus has been provided which provides gas or fluid under predetermined pressure to at least one inlet into a mold through either a porous metal cover or a poppet valve to apply the same or different pressures to different isolated portions of the mold. It should however, be clear that the present invention is not intended to be limited to the forms shown which are to be considered illustrative rather than restrictive.

I claim:

1. A method of forming an injection molded part, comprising the steps of:
   attaching a mold having a part defining cavity formed by a fixed portion and a movable portion to an injection molding machine, said mold cavity having isolated sections, said step of attaching including the step of attaching at least one gas pressure line to at least one of said isolated sections of said mold;
   injecting molten thermoplastic polymer into said cavity;
   introducing a gas under a predetermined pressure into said cavity through said one gas pressure line while said molten thermoplastic polymer is fluid to pressurize said thermoplastic polymer and to completely force said molten thermoplastic polymer against only one said mold portions, said introduced gas effecting the formation of a cavity portion in and external of said molten thermoplastic polymer;
   cooling said thermoplastic polymer in said cavity; and
   ejecting the part from said mold.

2. The method of forming an injection molded part in accordance with claim 1 in which the step of attaching at least one gas pressure line to said mold includes attaching a plurality of gas pressure lines to said mold and the step of injecting a gas under pressure into said mold cavity includes injecting a gas through a plurality of gas pressure lines.

3. The method of forming an injection molded part in accordance with claim 2 in which the step of attaching a plurality of gas pressure lines to said mold attaches said plurality of gas lines to said mold movable portion.

4. The method of forming an injection molded part in accordance with claim 33 in which the step of attaching a plurality of gas pressure lines to said mold attaches each gas pressure line through a popper valve opened by a predetermined gas pressure on said gas line.

5. The method of forming an injection molded part in accordance with claim 3 in which the step of attaching a plurality of gas pressure lines to said mold attaches each gas pressure line through a porous metal cover over an opening into said mold cavity.

6. The method of forming an injection molded part in accordance with claim 2 in which the step of injecting a gas under pressure into said mold cavity includes injecting a gas through a plurality of gas pressure lines, at least one of said gas pressure lines having pressure different from the other gas pressure lines.

7. The method of forming an injection molded part in accordance with claim 2 in which the step of injecting a gas under pressure into said mold cavity includes injecting a gas through a plurality of gas pressure lines under the same gas pressure in each gas a pressure line.

8. The method of forming an injection molded part in accordance with claim 1 including the step of injecting gas under pressure in said mold through said one gas pressure line after cooling said thermoplastic polymer in said mold whereby said gas aids in the ejecting of a part from said mold.

9. The method of forming an injection molded part in accordance with claim 1 wherein said gas introducing step causes said polymer to be forced against said one mold portion and said gas forming an open cavity in a side of said other mold portion, said open cavity being filled completely by said gas.

10. A method of forming an injection molded article comprising the steps of:
    attaching a mold system having a mold cavity formed in part by article defining surfaces to an injection molding machine including the step of attaching at least one gas pressure line to one side of said mold cavity;
    injecting molten thermoplastic polymer into said mold cavity;
    introducing a gas under pressure only into said mold cavity and through said one gas pressure line while said thermoplastic polymer is fluid to completely fill said mold cavity with a gas cushion to pressurize said molten thermoplastic polymer from said one side of the mold cavity only towards the opposite side of the cavity for retaining the thermoplastic against the article defining surfaces, said introduced gas effecting the formation of a cavity portion in and external of said molten thermoplastic polymer, said cavity portion being formed adjacent said one side of the mold cavity;
    cooling said thermoplastic polymer in said mold; and
    ejecting the part from said mold.

11. The method of forming an injection molded article in accordance with claim 10 wherein said mold cavity is formed by a cavity surface interrupted by chambers and comprises the article defining surfaces forming an outer appearance surface of the article, and said injecting step includes introducing molten thermoplastic into said chambers to form an article having an interior surface including bosses and ribs and said outer appearance surface essentially smooth and free of sink marks.

12. A method of producing a plastic article, the steps of the method comprising:
    injecting molten thermoplastic into a mold cavity having first and second opposite sides, and said mold cavity including cavity areas for defining a resultant shape of a molding having a smooth appearance and a non-appearance side, said appearance side being essentially free of sink marks and an opposite side including ribs and/or bosses;

introducing pressurized gas into the first side of the mold cavity only and prior to cooling of the thermoplastic such that the gas forces the thermoplastic away from the first side of the mold cavity towards the second side of the cavity forming the appearance side of the article, said introduced pressurized gas effecting the formation of a cavity portion on said non-appearance side of said molding; and maintaining the pressure of the gas Introduced into the cavity until the molding can sustain the shape dictated by the mold cavity areas.

* * * * *

UNITED STATES PATENT AND TRADEMARK OFFICE
CERTIFICATE OF CORRECTION

PATENT NO. : 5,643,527

DATED : July 1, 1997

INVENTOR(S) : Robert E. Carroll

It is certified that error appears in the above-identified patent and that said Letters Patent is hereby corrected as shown below:

Title Page, [63] Related US Data, Line 5, after "of" insert:
  --Ser. No. 561,157, Aug. 1, 1990, abandoned, which is a continuation of--

Title Page, [56] References Cited Line 11, Patent No. 4,755,128,
  "7/1988" should be --5/1988--

Col. 1, line 9, after "of" insert: --application Ser. No. 07/561,157,
  filed Aug. 1, 1990, now abandoned, which is a continuation of--

Col. 2, line 9, "molds portion" should be --mold portion--

Col. 2, line 31, "Onto" should be --onto--

Col. 3, line 10, "closed" should be --close--

Col. 3, line 48, "wall" should be --walls--

Col. 3, line 49, delete "an"

Col. 3, line 49, "portion" should be --portions--

Col. 3, line 58, "injection," should be --injection--

Col. 3, line 65, "remove," should be --remove--

UNITED STATES PATENT AND TRADEMARK OFFICE
CERTIFICATE OF CORRECTION

PATENT NO. : 5,643,527

DATED : July 1, 1997

INVENTOR(S) : Robert E. Carroll

It is certified that error appears in the above-identified patent and that said Letters Patent is hereby corrected as shown below:

Col. 4, line 6, "popper" should be --poppet--

Col. 4, line 8, "popper" should be --poppet--

Col. 4, line 38, "Of" should be --of--

Col. 5, line 66, claim 4, "claim 33" should be --claim 3--

Col. 6, line 1, claim 4, "popper" should be --poppet--

Col. 6, line 18, claim 7, delete "a"

Col. 8, line 4, claim 12, "Introduced" should be --introduced--

Signed and Sealed this

Tenth Day of February, 1998

Attest:

BRUCE LEHMAN

Attesting Officer

Commissioner of Patents and Trademarks